United States Patent [19]

Malachowski

[11] Patent Number: 4,750,956

[45] Date of Patent: Jun. 14, 1988

[54] FOAM BINDING

[75] Inventor: Michael A. Malachowski, Webster, N.Y.

[73] Assignee: Xerox Corporation, Stamford, Conn.

[21] Appl. No.: 943,452

[22] Filed: Dec. 19, 1986

[51] Int. Cl.[4] .............................................. B32B 31/06

[52] U.S. Cl. ...................................... 156/79; 156/212; 156/216; 156/242; 156/908; 412/8; 412/37; 428/192

[58] Field of Search .................... 156/78, 79, 908, 212, 156/216, 242; 412/8, 37; 428/192

[56] References Cited

U.S. PATENT DOCUMENTS

| | | | |
|---|---|---|---|
| 3,292,951 | 12/1966 | Schoenberger | 281/21 |
| 3,707,418 | 12/1972 | Bhagat et al. | 156/245 |
| 4,588,470 | 5/1986 | Abegglen | 156/578 |

FOREIGN PATENT DOCUMENTS 1159045 6/1958 France .

*Primary Examiner*—Robert A. Dawson

*Attorney, Agent, or Firm*—William A. Henry, II

[57] ABSTRACT

A method of binding sheets of a book having highly irregular edges while maintaining a flush thumb edge, includes applying a foam adhesive to the irregular edges and wrapping a spine tape with cold adhesive such that the spine tape contacts the book covers.

10 Claims, 1 Drawing Sheet

FOAM BINDING

This invention relates generally to binding and more particularly to a method for binding a plurality of sheets by the use of a foam adhesive.

Copying and duplicating machines feed cut sheets which have cutting tolerances (sheet-to-sheet/ream-to-ream) of ±1 mm USO and ±2 mm worldwide. Registrating of the binding edge of cut sheets to be bound is necessary due to present adhesive limitations and, therefore, makes for gross irregular edges on the opening (thumb) end of the book.

Irregular edges are not a problem in the bookbinding industry as shown in prior art FIGS. 1–4 because the books are signature printed in several steps and the signatures are trimmed and squared-up via a grinding process before an adhesive is applied, thereby presenting perfect spine edges for the adhesive application. This process is not practicle and too costly for the copying environment.

Various techniques have been tried for binding books. In U.S. Pat. No. 3,707,418 a bead of molten resinous material is applied to the edge of a stack of uniformly positioned sheets and is then placed around the uppermost and lowermost sheets in the stack. Molding dies are used to flare the molten resinous material which solidifies in the flared configuration upon cooling. A method for making patent bound books that is common in the industry is disclosed in U.S. Pat. No. 3,292,951 and includes the steps for gathering signatures to form a book of; applying a temporary adhesive to the edge of the gathered book; clamping the book together; rounding the book; and applying a permanent adhesive to the edge of the book. The sides are pressed in order to fan the pages so that wicking of the adhesive can take place. This patent does not take sheet tolerance into consideration. This is because before the book was bound, the edge to be bound was ground as in FIG. 7 to make it smooth. French Pat. No. 1159045 appears to show an apparatus for injecting a binding adhesive into and around the edge of a plurality of sheets. The sheets have been inserted and aligned within a mold. This patent like the U.S. Pat. No. 3,707,418 addresses perfect binding and not binding with irregular sheet edges. U.S. Pat. No. 4,588,470 shows an apparatus which applies a foam paste to the edge of a stack of paper sheets for binding purposes. A nozzle is used to supply a gaseous fluid to the adhesive to cause foaming and a doctor blade is provided to control the thickness of the foam to be applied. Foaming is used in this technique in the metering process and not in the binding process. The foam is allowed to dissipate leaving a hard adhesive as the binding means. A problem with this type of binding is that it is easy to tear the book along the spine because the adhesive is hard now that the foam has left. The foaming in this patent is used for application purposes only and not for continuing adhesive purposes.

Accordingly, a method is disclosed for binding stacks of cut sheets having a highly irregular binding edge includes the steps of: registering the sheets along the thumb edge; applying a foam adhesive along the irregular binding edge; and covering the adhesive foam with a strip of spine tape.

The novel features which are considered as characteristic of the invention are set forth in particular in the appended claims. The improved method will best be understood with reference to the following detailed description with reference to the following drawings in which:

Figure 1:
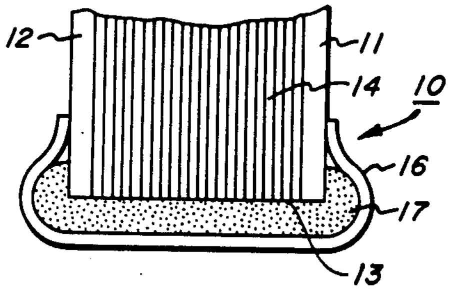
FIG. 1 (PRIOR ART)
FIGS. 1–4 are cross-sectional views of prior art book binding techniques.
Figure 2:
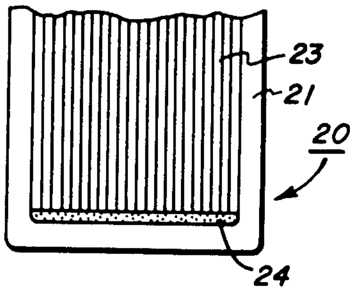
FIG. 2 (PRIOR ART)
Figure 3:
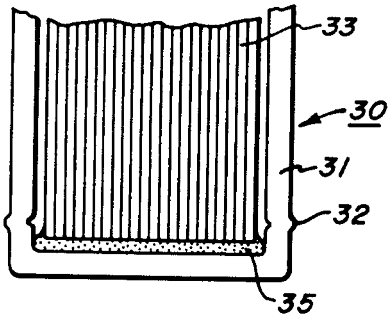
FIG. 3 (PRIOR ART)
Figure 4:
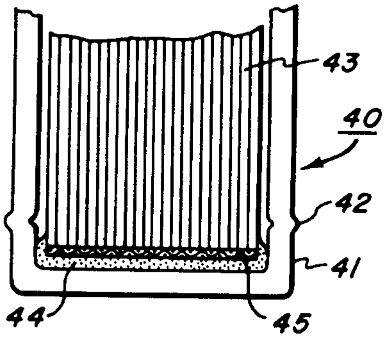
FIG. 4 (PRIOR ART)

The prior art book of FIG. 1 shows a book 10 with two covers 11 and 12, a perfect binding edge 13, an adhesive 17 along the binding edge and a spine tape 16 covering the adhesive and adhering to both the front and rear corners of the book. FIG. 2 is similar except that a single piece of material 21 serves as the spine tape as well as the front and rear covers of the book 20. In FIG. 3, the single piece covering 31 is spaced from the sides of the sheets 33 in the book 30 and the covering is scored at 32 in order to make movement of the covering easier. An adhesive 35 attaches the covering to the spine of the book. In FIG. 4, a screen mesh 45 is positioned behind the binding edge of sheets 43 of book 40. An adhesive 44 is applied to the binding edge of the sheets over the screen mesh. A single piece of material 41 which is scored at 42 is wrapped around the adhesive and serves as the front and rear covers for the book. These techniques and method are good when perfect binding is required, that is, where the binding edge is registered and the thumb or opening edge is also registered. Such is not the case when binding cut sheets from copiers and printers that have imperfect or irregular edges.

Figure 5:
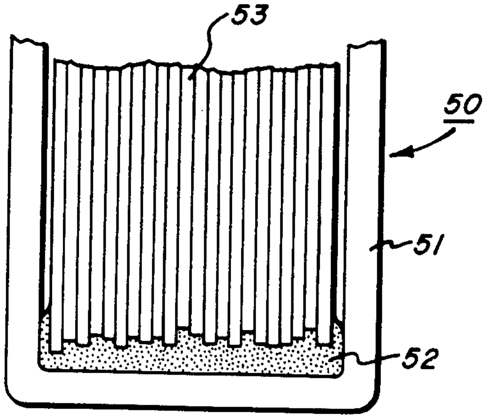
FIG. 5 is a cross-sectional view of a book bound with use of the method in accordance with the present invention.

Therefore, the method used in accordance with the present invention to bind book 50 in FIG. 5 is disclosed in order to provide a method for binding sheets with an irregular binding edge and a registered opening edge. The driving force behind this method is to provide an irregular edge gap filling capability through the use of a foaming adhesive on the binding edge of irregular sheets and thereby be able to bind a highly irregular binding edge while maintaining a straight and smooth (flush) thumb (opening) end of a book. Additionally, the foaming action tends to force the adhesive through wicking action into the gaps between each sheet as shown in FIG. 5, making for migration and penetration of the adhesive into the edge of the book 50 which makes for a durable bind. Sheets 53 are registered on the thumb edge and a foam adhesive 52 is applied to the irregular binding edge. The foam adhesive could be of the type called "Touch 'N Foam" marketed by Convenience Products, 4206 Forest Park Blvd., St. Louis, Mo. 63108. A single piece of material 51 is then placed around the foam adhesive and serves as the spine cover as well as front and rear covers for the book. Alternatively, separate and individual front and rear covers could be provided as well as a spine tape that would include a cold adhesive adapted to adhere to the front and back covers after covering the foam adhesive along the spine of the book.

The foam adhesive may be applied by one of three methods. For example, one can register the thumb edge of a stack of sheets; apply a bead of foam adhesive to the irregular spine edge of the stack of sheets; and wrap with spine tape having cold adhesive thereon for contacting front and rear covers. The spine tape as well as front and rear covers could be one piece of material if desired. Another method would be to register the thumb edge of the sheet stack; apply the foam adhesive in its pre-foam (liquid) state with rollers, a brush, a wick, etc; wrap the sheet stack with spine tape; and affix the spine tape to front and rear covers. A single piece of cover material is the preferred use. A third method for applying the foam adhesive is to inject the adhesive in its foam state into an adjustable molding/clamping device with the sheet stack having been registered along its thumb edge and a cover member placed around the irregular edge of the sheet stack. It should be understood that with any of the above described methods for applying foam adhesive to a sheet stack, the spine tape and covers could be in place before the foam adhesive is added.

In addition to being able to bind a sheet stack with an irregular edge, the methods disclosed have an advantage over prior adhesive binding systems such as in U.S. Pat. No. 4,588,470, in that the present methods are designed so that the adhesive is left in the foam state. This is important since tearing of the spine of a book is prevented because each cellular portion of the foam is separate and will therefore prevent tears from propagating. The apparatus of the U.S. Pat. No. 4,558,470 with obvious modifications can be used to apply the foam adhesive to sheet stacks in accordance with the present invention.

What is claimed is:

1. A method for binding a book having pages with irregular spine edges and a flush opening edge, comprising the steps of:

(a) applying a foam adhesive to said irregular edges of said pages, said foam being adapted to remain foamed after it is applied to the pages of the book; and (b) applying a wrapping means around said foam adhesive.

2. The method of claim 1, wherein said wrapping means includes a single piece of material.

3. The method of claim 1, wherein said wrapping means includes a spine tape and individual front and back covers, said spine tape being adapted to cover said foam adhesive and said irregular edges of said pages and contact said front and rear covers in order to form a complete book.

4. The method of claim 3, wherein said spine tape includes a cold adhesive adapted to adhere said spine tape to said front and rear covers of the book.

5. A method for binding cut sheets having irregular edges that have exited a printing apparatus, comprising the steps of:

registering the cut sheets so as to provide a flush opening edge and irregular spine edges;

applying foam adhesive over said irregular spine edges, said foam being adapted to remain foamed after it is applied to the irregular spine edges of the cut sheets; and wrapping a spine cover around said foam adhesive.

6. The method of claim 4, wherein said spine cover is a single cut sheet that also serves as front and rear covers for the cut sheets.

7. The method of claim 5, including the step of providing front and rear covers for the cut sheets.

8. The method of claim 7, wherein said spine cover comprises tape means having a cold adhesive applied thereto and adapted for adherence to said front and rear covers.

9. The method of claim 5, wherein said foam adhesive is applied in its pre-foam state and including the step of foaming the adhesive after it is applied.

10. The method of claim 5, wherein said foam adhesive is applied between said spine cover and said irregular edges in its foam state by injection molding.

* * * * *